US009209879B2

(12) United States Patent
Lim et al.

(10) Patent No.: US 9,209,879 B2
(45) Date of Patent: Dec. 8, 2015

(54) APPARATUS AND METHOD FOR OPERATING A SOUNDING ANTENNA SWITCHING SCHEME IN A MOBILE COMMUNICATION SYSTEM

(75) Inventors: Chi-Woo Lim, Suwon-si (KR); Tae-Young Kim, Seongnam-si (KR); Mi-Hyun Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 216 days.

(21) Appl. No.: 13/181,408

(22) Filed: Jul. 12, 2011

(65) Prior Publication Data
US 2012/0008558 A1    Jan. 12, 2012

(30) Foreign Application Priority Data

Jul. 12, 2010   (KR) .................. 10-2010-0067122
Oct. 20, 2010   (KR) .................. 10-2010-0102609

(51) Int. Cl.
*H04B 7/02* (2006.01)
*H04B 7/06* (2006.01)
*H04B 7/08* (2006.01)

(52) U.S. Cl.
CPC ............ *H04B 7/0602* (2013.01); *H04B 7/0802* (2013.01); *H04B 7/0628* (2013.01)

(58) Field of Classification Search
CPC .. H04B 7/0452; H04B 7/0417; H04B 7/0691; H04B 7/0413; H04B 7/0628; H04B 7/0689; H04B 7/0874; H04B 7/0604; H04B 7/0602; H04B 7/0608; H04B 7/0802; H04L 25/0228; H04L 25/0224; H04W 28/18

USPC ......... 370/254, 276, 277, 278, 282, 310, 328, 370/339, 464, 465; 455/422.1, 73, 78, 455/553.1, 562.1, 91, 95, 103
See application file for complete search history.

(56) References Cited

U.S. PATENT DOCUMENTS

| | | | |
|---|---|---|---|
| 7,924,803 B2 * | 4/2011 | Tao et al. ..................... 370/344 |
| 8,284,725 B2 * | 10/2012 | Ahmadi ........................ 370/329 |
| 2007/0173208 A1 * | 7/2007 | Nishio et al. .................... 455/78 |
| 2009/0016312 A1 * | 1/2009 | Tao et al. ...................... 370/344 |
| 2009/0054093 A1 | 2/2009 | Kim et al. |
| 2009/0225879 A1 | 9/2009 | Kloos et al. |
| 2009/0274226 A1 | 11/2009 | Mondal et al. |
| 2010/0061346 A1 * | 3/2010 | Wang et al. ................... 370/336 |
| 2010/0111226 A1 | 5/2010 | Ko et al. |

(Continued)

FOREIGN PATENT DOCUMENTS

CN         101753188 A       6/2010

OTHER PUBLICATIONS

International Search Report dated Feb. 28, 2012 in connection with International Patent Application No. PCT/KR2011/005073.
Chiwoo Lim, et al., "Adding the negotiation fields for sounding antenna switching (16.2.3.7)", Jul. 9, 2010, 3 pages.

(Continued)

*Primary Examiner* — Curtis A Alia

(57) ABSTRACT

In a mobile communication system, an Advanced Mobile Station (AMS) sends, to an Advanced Base Station (ABS), a message including information indicating whether the AMS supports a sounding antenna switching scheme. If the information indicates that the AMS supports the sounding antenna switching scheme, the message including the information includes information indicating an antenna configuration that the AMS desires to use in a sounding antenna switching operation.

16 Claims, 3 Drawing Sheets

(56) References Cited

U.S. PATENT DOCUMENTS

2010/0234071 A1* 9/2010 Shabtay et al. ............ 455/562.1
2010/0316026 A1* 12/2010 Lee et al. ...................... 370/336

OTHER PUBLICATIONS

Tao, et al.; "Uplink Sounding for Antenna Selection at Mobile Station"; IEEE 802.16 Broadband Wireless Access Working Group; Jul. 7, 2008; 5 pp.

Examination Report dated Oct. 8, 2013 in connection with Japanese Patent Application No. 2013-519581; 5 pp.

Text of the First Office Action dated Nov. 2, 2014 in connection with Chinese Patent Application No. 201180037418.4; 12 pages.

Wang, et al.; "Proposed Amendment Text on 802.16m Amendment on the PHY Structure for UL Control-Recommended AWD Text Proposal #8"; IEEE C802.16m-09/0664, Mar. 2, 2009; 3 pgs.

* cited by examiner

APPARATUS AND METHOD FOR OPERATING A SOUNDING ANTENNA SWITCHING SCHEME IN A MOBILE COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean Patent Application filed in the Korean Intellectual Property Office on Jul. 12, 2010 and assigned Serial No. 10-2010-0067122, and a Korean Patent Application filed in the Korean Intellectual Property Office on Oct. 20, 2010 and assigned Serial No. 10-2010-0102609, the entire disclosure of which is hereby incorporated by reference.

TECHNICAL FIELD OF THE INVENTION

The present invention relates to an apparatus and method for operating a sounding antenna switching scheme in a mobile communication system.

BACKGROUND OF THE INVENTION

In an Institute of Electrical and Electronics Engineers (IEEE) 802.16m communication system, a typical example of mobile communication systems, sounding channel signals are used to efficiently use a BeamForming (BF) scheme and a Multi User Multiple Input Multiple Output (MU-MIMO) scheme in a Downlink (DL). A sounding channel is an Uplink (UL) channel, and a sounding channel signal is transmitted via each of a number of transmit antennas used by an Advanced Mobile Station (AMS). An Advanced Base Station (ABS) may estimate a DL channel state for the AMS based on the sounding channel signal transmitted via each of the transmit antennas of the AMS. If the AMS, which has the same number of transmit antennas and receive antennas (i.e., has N transmit antennas and N receive antennas), transmits a sounding channel signal via each of the N transmit antennas, the ABS receives the sounding channel signal transmitted via each of the N transmit antennas, and may estimate a DL channel state for the AMS, assuming that a UL channel state for each of the N transmit antennas is equal to a DL channel state for each of the N receive antennas.

However, there might be an AMS whose transmit antennas are less than receive antennas in number. In this situation, the ABS may not accurately estimate a DL channel state based on the sounding channel signals that the AMS transmits via the transmit antennas, making it difficult or impossible to efficiently use the BF scheme and the MU-MIMO scheme for the AMS. This configuration in which the number of transmit antennas is less than the number of receive antennas will be referred to as an 'asymmetric antenna configuration', and an AMS having an asymmetric antenna configuration will be referred to herein as an asymmetric antenna configuration AMS, for convenience of description. Therefore, in the IEEE 802.16m communication system, a sounding antenna switching scheme has been proposed for the asymmetric antenna configuration AMSs. The sounding antenna switching scheme will be described below.

In the sounding antenna switching scheme, even an asymmetric antenna configuration AMS may transmit the same number of sounding channel signals as the number of receive antennas by switching antennas because actually, the number of physical antennas may be equal to or greater than the number of receive antennas.

At present, however, it is merely provided that in the IEEE 802.16m communication system, sounding channel signals may be transmitted using the sounding antenna switching scheme as described above, and any specific operation plan for the sounding antenna switching scheme has not been suggested yet.

SUMMARY OF THE INVENTION

To address the above-discussed deficiencies of the prior art, it is a primary object to provide an apparatus and method for operating a sounding antenna switching scheme in a mobile communication system.

In accordance with one aspect of the present invention, there is provided a method for operating a sounding antenna switching scheme by an Advanced Mobile Station (AMS) in a mobile communication system. The method includes sending, to an Advanced Base Station (ABS), a message including information indicating whether the AMS supports the sounding antenna switching scheme.

In accordance with another aspect of the present invention, there is provided a method for operating a sounding antenna switching scheme by an Advanced Base Station (ABS) in a mobile communication system. The method includes receiving, from an Advanced Mobile Station (AMS), a message including information indicating whether the AMS supports the sounding antenna switching scheme.

In accordance with further another aspect of the present invention, there is provided an Advanced Mobile Station (AMS) in a mobile communication system. The AMS includes a transmission unit configured to send, to an Advanced Base Station (ABS), a message including information indicating whether the AMS supports a sounding antenna switching scheme.

In accordance with yet another aspect of the present invention, there is provided an Advanced Base Station (ABS) in a mobile communication system. The ABS includes a reception unit configured to receive, from an Advanced Mobile Station (AMS), a message including information indicating whether the AMS supports a sounding antenna switching scheme.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
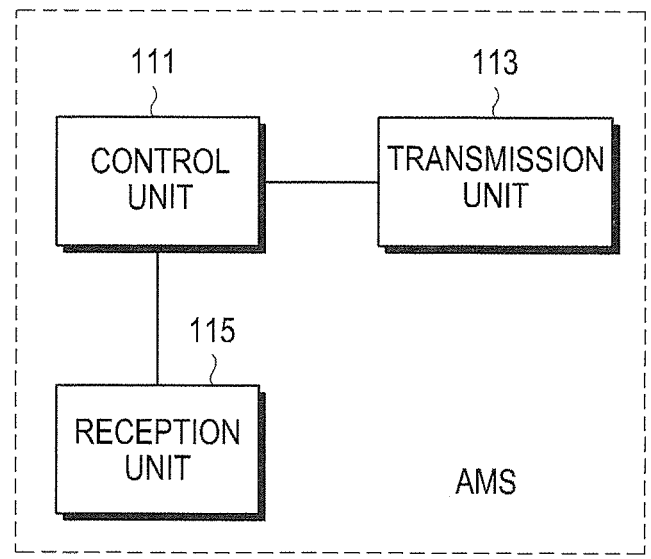
FIG. 1 is a diagram illustrating an internal structure of an AMS in an IEEE 802.16m communication system according to an embodiment of the present invention.

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system. In the following description, specific details such as detailed configuration and components are merely provided to assist the overall understanding of exemplary embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

The present invention provides an apparatus and method for operating a sounding antenna switching scheme in a mobile communication system. Although an Institute of Electrical and Electronics Engineers (IEEE) 802.16m communication system will be considered herein as an example of the mobile communication system, it will be understood by those of ordinary skill in the art that the sounding antenna switching scheme operating apparatus and method proposed by the present invention may be used not only in the IEEE 802.16m communication system, but also in other mobile communication systems, such as a Worldwide Interoperability for Microwave Access (WiMAX) communication system.

In an embodiment of the present invention, a negotiation operation of determining whether an Advanced Base Station (ABS) and its associated Advanced Mobile Station (AMS) support the sounding antenna switching scheme is first performed in the IEEE 802.16m communication system. The AMS provides information indicating whether it supports the sounding antenna switching scheme, to the ABS using a message, e.g., an Advanced Air Interface Registration Request (AAI_REG-REQ) message. A format of the information indicating supportability of the sounding antenna switching scheme, included in the AAI_REG-REQ message, is defined as shown in Table 1 below.

TABLE 1

| Attributes/Array of attributes | Size (bits) | Value/Note |
|---|---|---|
| Capability for sounding antenna switching support | 1 | 0b0: no support<br>0b1: support |

In Table 1, a 'Capability for sounding antenna switching support' field represents information indicating supportability of the sounding antenna switching scheme, and may be realized with, for example, one bit. For example, if a bit value of the 'Capability for sounding antenna switching support' field is '0 (0b0)', it indicates that the AMS cannot support the sounding antenna switching scheme. Alternatively, if a bit value of the 'Capability for sounding antenna switching support' field is '1 (0b1)', it indicates that the AMS supports the sounding antenna switching scheme.

As described above, an AMS may inform an ABS whether it supports the sounding antenna switching scheme, using the AAI_REG-REQ message. Thus, based on the AAI_REG-REQ message, the ABS may determine whether the ABS supports the sounding antenna switching scheme.

In response to the AAI_REG-REQ message, the ABS may include a 'Capability for sounding antenna switching support' field in an Advanced Air Interface Registration Response (AAI_REG-RSP) message to have the same field value as that of the 'Capability for sounding antenna switching support' field included in the AAI_REG-REQ message, and send the AAI_REG-RSP message to the AMS. In the alternative, the ABS may merely determine whether the AMS supports the sounding antenna switching scheme, without including the 'Capability for sounding antenna switching support' field in the AAI_REG-RSP message.

Generally, the sounding antenna switching scheme can support only AMSs having a plurality of transmit antennas. Therefore, an ABS considers that only the AMSs having a plurality of transmit antennas may support the sounding antenna switching scheme.

However, even an AMS having one transmit antenna and a plurality of receive antennas may support the sounding antenna switching scheme using the plurality of receive antennas. Nevertheless, in this situation, the ABS determines that the AMS does not support the sounding antenna switching scheme just because it has only one transmit antenna.

Therefore, AMS's accurately informing the ABS whether it supports the sounding antenna switching scheme is very important in terms of the overall system performance. Hence, in an embodiment of the present invention, an AMS informs an ABS whether it supports the sounding antenna switching scheme, using the AAI_REG-REQ message.

An internal structure of an AMS in an IEEE 802.16m communication system according to an embodiment of the present invention will now be described with reference to FIG. 1.

FIG. 1 illustrates an internal structure of an AMS in an IEEE 802.16m communication system according to an embodiment of the present invention.

Referring to FIG. 1, the AMS includes a control unit 111, a transmission unit 113, and a reception unit 115.

The control unit 111 controls the overall operation of the AMS, i.e., various operations for informing an ABS whether it supports the sounding antenna switching scheme, and particularly, generates various messages such as an AAI_REG-REQ message and an AAI_REG-RSP message, which are shown in Table 1 and Table 2, respectively, as described below. The transmission unit 113 sends various messages generated by the control unit 111 to the ABS under control of the control unit 111. The reception unit 115 receives various messages from the ABS under control of the control unit 111.

Although the control unit 111, the transmission unit 113, and the reception unit 115 are shown as separate units in FIG. 1 by way of example, they may be realized in a single unit in an integrated way.

It will be assumed that the AMS has one transmit antenna and two receive antennas. The transmit antenna and the receive antennas may be realized physically separately, or may be logically distinguished though they are physically identical. For convenience of description, an AMS having one transmit antenna and two receive antennas will be referred to herein as a '1Tx/2Rx AMS'.

For the 1Tx/2Rx AMS, in a Downlink (DL), since two receive antennas exist, 4*2 channels are generated if an ABS has four transmit antennas. In this situation, in order for the ABS to estimate a DL channel state, sounding channel signals should be transmitted at both of the two receive antennas. However, because general sounding channel transmission is achieved through a transmit antenna(s) of an AMS, the 1Tx/2Rx AMS transmits a sounding channel signal via one transmit antenna, making it difficult for an ABS to estimate a DL channel state for the 1Tx/2Rx AMS. Therefore, in order to accurately estimate a DL channel state even for an AMS having only one transmit antenna like the 1Tx/2Rx AMS, the ABS should allow the AMS to switch the receive antennas to transmit antennas, and transmit sounding channel signals via the transmit antennas.

Because even the AMS having one transmit antenna may switch receive antennas to transmit antennas and transmit sounding channel signals via the transmit antennas as described above, an AMS according to an embodiment of the present invention informs an ABS whether it supports the sounding antenna switching scheme using the 'Capability for sounding antenna switching support' field as described above.

If the AMS supports the sounding antenna switching scheme, the ABS may request the AMS to perform the sounding antenna switching scheme, using an Information Element (IE), e.g., a sounding command Advanced (A)-MAP IE. The sounding antenna switching scheme will be described in brief below.

An AMS using the sounding antenna switching scheme transmits a sounding channel signal through only one transmit antenna rather than all of its available transmit antennas at a time it can transmit a sounding channel signal, and transmits a sounding channel signal only through another one transmit antenna at the next time it can transmit a sounding channel signal. In other words, the AMS sequentially uses each of its available transmit antennas in transmitting sounding channel signals.

However, an AMS having an asymmetric antenna configuration, in which the number of transmit antennas is less than the number of receive antennas (i.e., an asymmetric antenna configuration AMS), may have problems in transmitting sounding channel signals based on which an ABS estimates a DL channel, because the number of transmit antennas is less than the number of receive antennas. The above-described 1Tx/2Rx AMS is also an asymmetric antenna configuration AMS.

Therefore, an embodiment of the present invention provides a method in which an ABS and an AMS performs a negotiation operation to determine in advance an antenna configuration that the AMS will use in transmitting sounding channels using the sounding antenna switching. In other words, an embodiment of the present invention provides a method in which an asymmetric antenna configuration AMS negotiates with an ABS over an antenna configuration it will use in transmitting sounding channel signals, depending on its capability.

The sounding antenna switching is AMS class-specific capability, for which a negotiation between an AMS and an ABS is performed before sounding channel signals are actually transmitted. A transmit antenna(s) of an AMS refers to the number of Multi User Multiple Input Multiple Output (MU-MIMO) streams that the AMS can simultaneously transmit in transmitting Uplink (UL) data, so it may be different from the number of actual physical antennas, or the number of receive antennas for receiving DL data.

The number of receive antennas of an AMS refers to the number of MIMO streams that the AMS can simultaneously receive in receiving DL data, and it may be different from the number of actual physical antennas, or the number of transmit antennas for transmitting UL data. Therefore, in the IEEE 802.16m communication system, the number of transmit antennas for a UL, included in an AMS, may be different from the number of receive antennas for a DL, included in the AMS.

If the number of transmit antennas and the number of receive antennas included in an AMS are different in this way, the AMS transmits the same number of sounding channel signals as the number of receive antennas through sounding antenna switching, for accurate DL channel estimation.

Therefore, in the present invention, an 'Antenna configuration for Sounding antenna switching' field is included in each of an AAI_REG-REQ message and an AAI_REG-RSP message as shown in Table 2 to make it possible to carry out negotiations over an antenna configuration to be used for sounding antenna switching, according to the capability of an AMS.

TABLE 2

| Attributes/Array of attributes | Size (bits) | Value/Note | Conditions |
| --- | --- | --- | --- |
| Antenna configuration for Sounding antenna switching | 1 | 0b0: Among DL Rx antennas 0b1: Among UL Tx antennas | Capability for sounding antenna switching support is 0b1. |

In Table 2, an 'Antenna configuration for Sounding antenna switching' field represents an antenna configuration that an AMS uses for sounding antenna switching. For example, if a field value of the 'Antenna configuration for Sounding antenna switching' field is '0 (0b0)', it indicates that the AMS transmits sounding channel signals via receive antennas. If a field value of the 'Antenna configuration for Sounding antenna switching' field is '1 (0b1)', it indicates that the AMS uses some of the transmit antennas to transmit sounding channel signals. For example, assuming that the number of receive antennas is N and the number of transmit antennas is N, if a field value of the 'Antenna configuration for Sounding antenna switching' field is '0 (0b0)', the AMS may transmit sounding channel signals via any one of a total of N receive antennas #1 to #N at a sounding channel signal transmission time. A field value of an 'Antenna configuration for Sounding antenna switching' field included in the AAI_REG-RSP message may be '0 (0b0)' only when a field value of an 'Antenna configuration for Sounding antenna switching' field included in the AAI_REG-REQ message is '0 (0b0)'.

Alternatively, if a field value of the 'Antenna configuration for Sounding antenna switching' field is '1 (0b1)', the AMS may transmit sounding channel signals via any one of a total of N transmit antennas #1 to #N at a sounding channel signal transmission time.

The 'Antenna configuration for Sounding antenna switching' field is included in the AAI_REG-REQ and AAI_REG-RSP messages only when a field value of the 'Capability for sounding antenna switching support' field is '1 (0b1)'.

As described above, based on the 'Antenna configuration for Sounding antenna switching' field, an AMS and an ABS may determine which antenna configuration the AMS uses in performing a sounding antenna switching operation. In performing the sounding antenna switching operation using the 'Antenna configuration for Sounding antenna switching' field, the AMS may inform an ABS of the AMS's capability for the antenna configuration it will use, and the ABS may finally determine the antenna configuration the AMS will use, based on the AAI_REG-RSP message.

A method, in which the ABS determines the antenna configuration the AMS will use in a sounding antenna switching operation, will now be described in detail below.

First, if an AMS informed an ABS that it will perform a sounding antenna switching operation through transmit antennas, using an AAI_REG-REQ message (i.e., if the AMS sent to the ABS the AAI_REG-REQ message with a field value of an 'Antenna configuration for Sounding antenna switching' field being set as '1(0b1)', then the ABS sends to the AMS an AAI_REG-RSP message with a field value of an 'Antenna configuration for Sounding antenna switching' field being set as '1 (0b1)' so that the AMS may perform the sounding antenna switching operation through transmit antennas. In other words, if the AMS informs the ABS that it will perform a sounding antenna switching operation through transmit antennas, the ABS does not command the AMS to perform the sounding antenna switching operation through receive antennas.

Second, if an AMS informed an ABS that it will perform a sounding antenna switching operation through receive antennas, using an AAI_REG-REQ message (i.e., if the AMS sent to the ABS the AAI_REG-REQ message with a field value of an 'Antenna configuration for Sounding antenna switching' field being set as '0 (0b0)', the ABS determines whether the AMS will perform the sounding antenna switching operation through receive antennas or transmit antennas, if necessary. In other words, the ABS may determine whether the AMS will perform the sounding antenna switching operation through receive antennas or transmit antennas, if necessary, only when a field value of the 'Antenna configuration for Sounding antenna switching' field included in the AAI_REG-REQ message is set as '0 (0b0)'.

As a result, even though the number of transmit antennas included in an AMS is less than the number of receive antennas included in the AMS, upon determining that the AMS may transmit sounding channel signals corresponding to the number of receive antennas through sounding antenna switching, an ABS may determine the antenna configuration the AMS will use in performing the sounding antenna switching operation, if necessary, and inform the AMS of the determination results.

As described above, in an embodiment of the present invention, through negotiations in sounding antenna switching, an AMS and an ABS may determine whether the AMS can support the sounding antenna switching and determine an antenna configuration that the AMS will use in performing the sounding antenna switching. Therefore, even for an asymmetric antenna configuration AMS, a BeamForming (BF) scheme and an MU-MIMO scheme may be efficiently used in a DL.

An internal structure of an ABS in an IEEE 802.16m communication system according to an embodiment of the present invention will now be described below with reference to FIG. 2.

Figure 2:
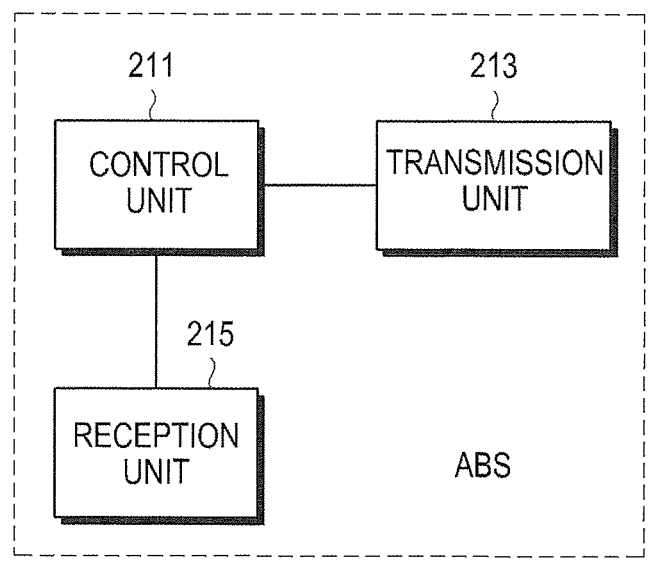
FIG. 2 is a diagram illustrating an internal structure of an ABS in an IEEE 802.16m communication system according to an embodiment of the present invention.

FIG. 2 illustrates an internal structure of an ABS in an IEEE 802.16m communication system according to an embodiment of the present invention.

Referring to FIG. 2, the ABS includes a control unit 211, a transmission unit 213, and a reception unit 215.

The control unit 211 controls the overall operation of the ABS, i.e., various operations for determining whether the AMS supports the sounding antenna switching scheme and determining an antenna configuration that the AMS will use for the sounding antenna switching, and particularly, generating various messages such as an AAI_REG-REQ message and an AAI_REG-RSP message, which have been described with reference to Table 1 and Table 2, respectively. The transmission unit 213 sends various messages generated by the control unit 211 to the AMS under control of the control unit 211. The reception unit 215 receives various messages from the AMS under control of the control unit 211.

Although the control unit 211, the transmission unit 213, and the reception unit 215 are shown as separate units in FIG. 2 by way of example, they may be realized in a single unit in an integrated way.

An operation of an AMS in an IEEE 802.16m communication system according to an embodiment of the present invention will now be described below with reference to FIG. 3.

Figure 3:
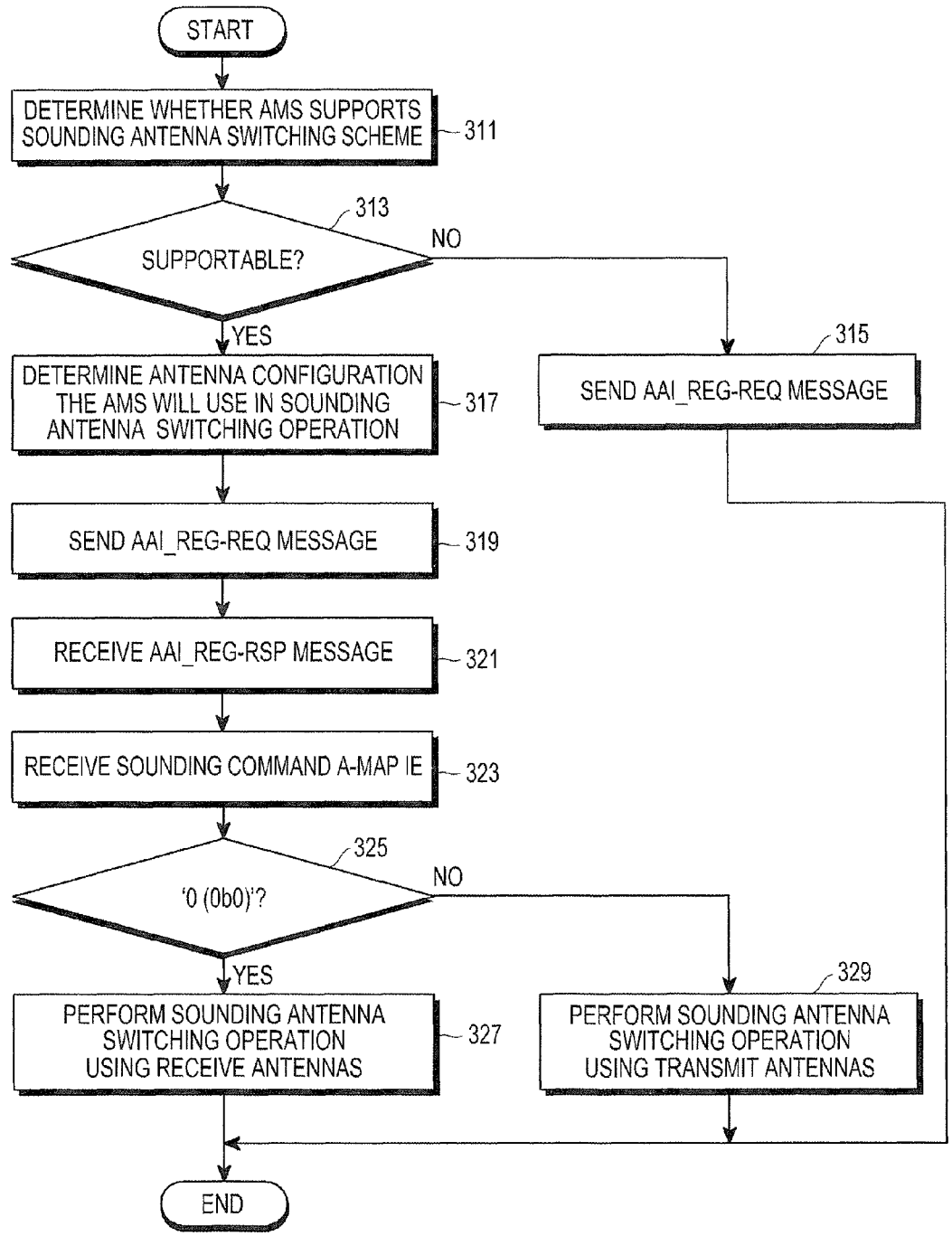
FIG. 3 is a flowchart illustrating an operation of an AMS in an IEEE 802.16m communication system according to an embodiment of the present invention.

FIG. 3 illustrates an operation of an AMS in an IEEE 802.16m communication system according to an embodiment of the present invention.

Referring to FIG. 3, the AMS determines whether to support the sounding antenna switching scheme in block 311, and determines in block 313 whether it can support the sounding antenna switching scheme. If the AMS cannot support the sounding antenna switching scheme, the AMS sends to an ABS an AAI_REG-REQ message with a field value of a 'Capability for sounding antenna switching support' field being set as '0 (0b0)', in block 315.

Alternatively, if it is determined in block 313 that the AMS can support the sounding antenna switching scheme, the AMS determines an antenna configuration that it will use in performing the sounding antenna switching operation, in block 317. In block 319, the AMS sends to the ABS an AAA_REG-REQ message including a 'Capability for sounding antenna switching support' field indicating a field value of '1 (0b1)' and an 'Antenna configuration for Sounding antenna switching' field indicating the determined antenna configuration.

The AMS receives an AAI_REG-RSP message from the ABS in block 321, and receives a sounding command A-MAP IE from the ABS in block 323. The AMS determines in block 325 whether a field value of the 'Antenna configuration for Sounding antenna switching' field included in the received AAI_REG-RSP message is '0 (0b0)'. If a field value of the 'Antenna configuration for Sounding antenna switching' field is '0 (0b0)', the AMS performs a sounding antenna switching operation through receive antennas in block 327.

Alternatively, if it is determined in block 325 that a field value of the 'Antenna configuration for Sounding antenna switching' field is '1 (0b1)', the AMS performs the sounding antenna switching operation through transmit antennas in block 329.

An operation of an ABS in an IEEE 802.16m communication system according to an embodiment of the present invention will now be described below with reference to FIG. 4.

Figure 4:
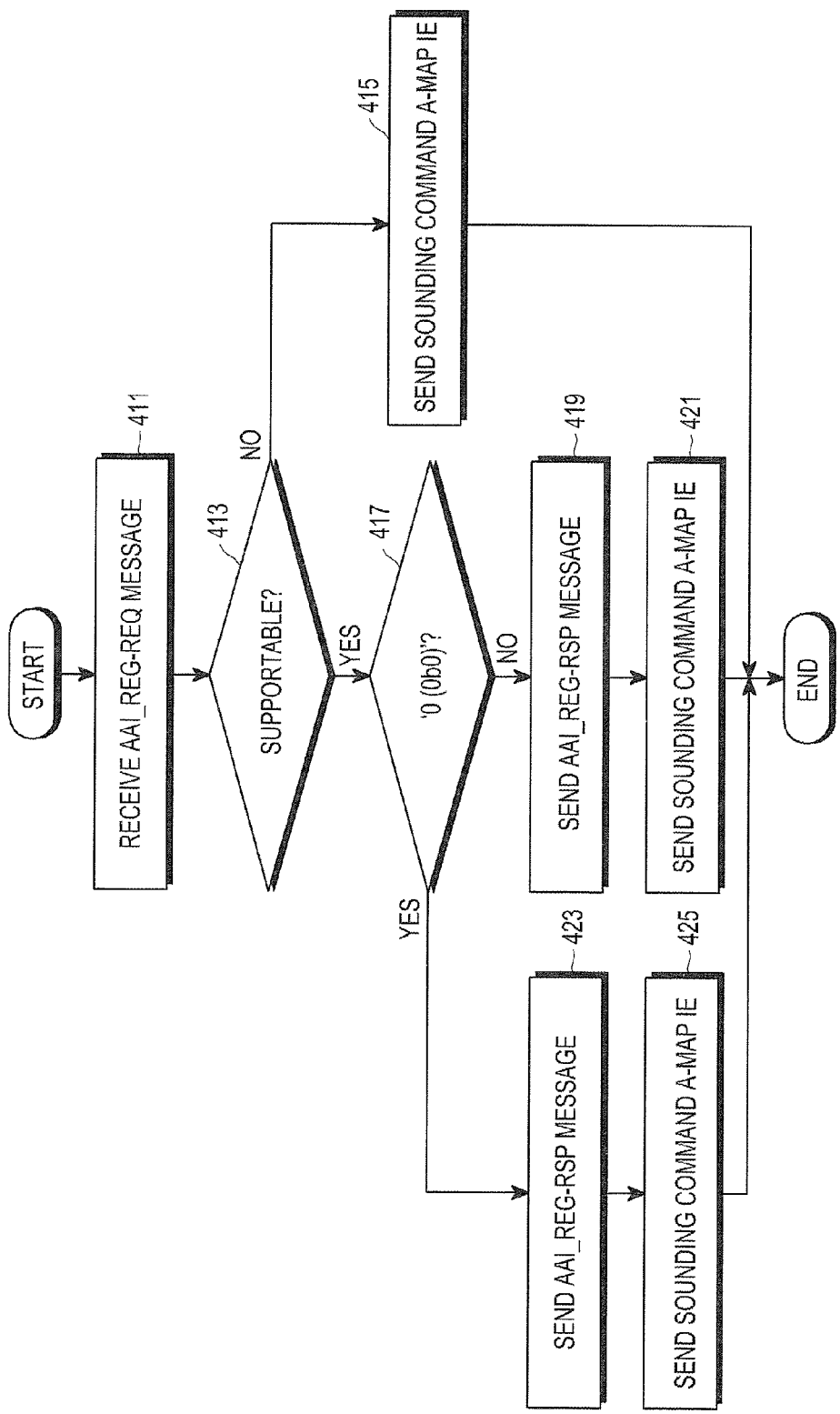
FIG. 4 is a flowchart illustrating an operation of an ABS in an IEEE 802.16m communication system according to an embodiment of the present invention.

FIG. 4 illustrates an operation of an ABS in an IEEE 802.16m communication system according to an embodiment of the present invention.

Referring to FIG. 4, the ABS receives an AAI_REG-REQ message from an AMS in block 411, and determines in block 413 whether the AMS can support a sounding antenna switching scheme. The ABS may determine whether the AMS can support a sounding antenna switching scheme, based on a 'Capability for sounding antenna switching support' field included in the received AAI_REG-REQ message. If the AMS cannot support the sounding antenna switching scheme, the ABS sends a sounding command A-MAP IE to the AMS in block 415. The sounding command A-MAP IE does not include information for commanding the AMS to perform the sounding antenna switching operation.

Alternatively, if it is determined in block 413 that the AMS can support the sounding antenna switching scheme, the ABS determines in block 417 whether a field value of an 'Antenna configuration for Sounding antenna switching' field included in the received AAI_REG-REQ message is '0 (0b0)'. If a field value of the 'Antenna configuration for Sounding antenna switching' field is not '0 (0b0)', but '1 (0b1)', the ABS sends to the AMS an AAI_REG-RSP message with a field value of an 'Antenna configuration for Sounding antenna switching' field being set as '1(0b1)', in block 419. In block 421, the ABS sends to the AMS a sounding command A-MAP IE including information for commanding the AMS to perform a sounding antenna switching operation.

Alternatively, if it is determined in block 417 that a field value of the 'Antenna configuration for Sounding antenna switching' field is '0 (0b0)' the ABS determines an antenna configuration that the AMS will use in performing the sounding antenna switching operation and sends to the AMS an AAI_REG-RSP message with a field value of an 'Antenna configuration for Sounding antenna switching' field being set according to the determination results, in block 423. In block 425, the ABS sends to the AMS a sounding command A-MAP IE including information for commanding the AMS to perform the sounding antenna switching operation.

As is apparent from the foregoing description, the present invention enables an IEEE 802.16m communication system to operate a sounding antenna switching scheme to ensure accurate estimation of a DL channel state.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method to operate a sounding antenna switching scheme by a mobile station (MS) in a mobile communication system, the method comprising:
   transmitting, to a base station (BS), a message comprising first information indicating whether the MS supports the sounding antenna switching scheme,
   wherein, when the first information indicates that the MS supports the sounding antenna switching scheme, the message further comprises at least one of second information indicating that at least one receive antenna transmits a sounding signal or third information indicating that at least one transmit antenna transmits the sounding signal.

2. The method of claim 1, further comprising:
   receiving from the BS a response message comprising the third information when the first information indicates that the MS supports the sounding antenna switching scheme.

3. The method of claim 2, further comprising transmitting, to the BS, the sounding signal according to the response message.

4. The method of claim 1, wherein the at least one receive antenna and the at least one transmit antenna are physically separated or logically distinguished.

5. A method to operate a sounding antenna switching scheme by a base station (BS) in a mobile communication system, the method comprising:
   receiving, from a mobile station (MS), a message comprising first information indicating whether the MS supports the sounding antenna switching scheme,
   wherein, when the first information indicates that the MS supports the sounding antenna switching scheme, the message further comprises at least one of second information indicating that at least one receive antenna transmits a sounding signal or third information indicating that at least one transmit antenna transmits the sounding signal.

6. The method of claim 5, further comprising:
   transmitting to the MS a response message comprising the third information when the first information indicates that the MS supports the sounding antenna switching scheme.

7. The method of claim 6, further comprising receiving, from the MS, the sounding signal which is transmitted according to the response message.

8. The method of claim 5, wherein the at least one receive antenna and the at least one transmit antenna are physically separated or logically distinguished.

9. A mobile station (MS) in a mobile communication system, the MS comprising:
   a transmission unit configured to transmit, to a base station (BS), a message comprising first information indicating whether the MS supports a sounding antenna switching scheme,
   wherein, when the first information indicates that the MS supports the sounding antenna switching scheme, the message further comprises at least one of second information indicating that at least one receive transmits a sounding signal or third information indicating that at least one transmit transmits the sounding signal.

10. The MS of claim 9, further comprising:
    a reception unit configured to receive from the BS a response message comprising the third information when the first information indicates that the MS supports the sounding antenna switching scheme.

11. The MS of claim 10, wherein the transmission unit transmits, to the BS, the sounding signal according to the response message.

12. The MS of claim 9, wherein the at least one receive antenna and the at least one transmit antenna are physically separated or logically distinguished.

13. A base station (BS) in a mobile communication system, the BS comprising:
    a reception unit configured to receive, from a mobile station (MS), a message comprising first information indicating whether the MS supports a sounding antenna switching scheme,
    wherein, when the first information indicates that the MS supports the sounding antenna switching scheme, the message further comprises at least one of second information indicating that at least one receive antenna transmits a sounding signal or third information indicating that at least one transmit antenna transmits the sounding signal.

14. The BS of claim 13, further comprising a transmission unit configured to transmit to the MS a response message comprising the third information when the first information indicates that the MS supports the sounding antenna switching scheme.

15. The BS of claim 14, wherein the reception unit receives, from the MS, the sounding signal that is transmitted according to the response message.

16. The BS of claim 13, wherein the at least one receive antenna and the at least one transmit antenna are physically separated or logically distinguished.

* * * * *